Jan. 6, 1953     M. F. THORNE     2,624,323
VALVE ROTATING ASSEMBLY
Filed July 22, 1950     3 Sheets-Sheet 1
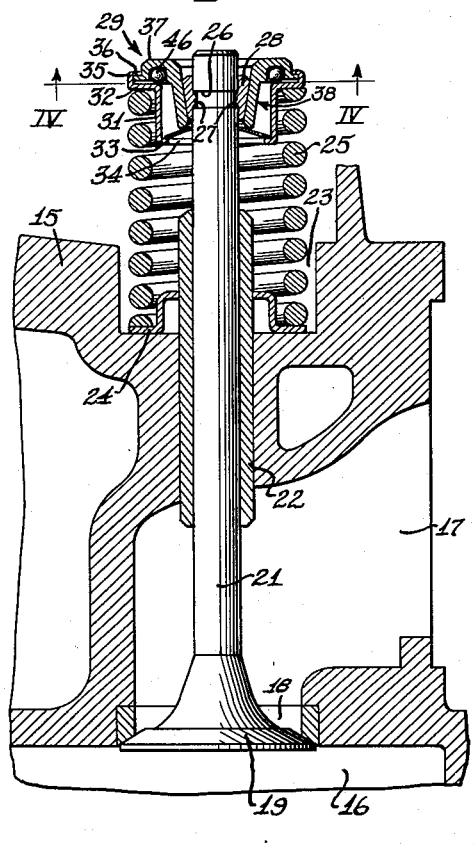
Inventor:
Marion F. Thorne Jan. 6, 1953     M. F. THORNE     2,624,323
VALVE ROTATING ASSEMBLY
Filed July 22, 1950     3 Sheets—Sheet 2

Inventor:—
Marion F. Thorne
By *[signature]*     Attys

Jan. 6, 1953     M. F. THORNE     2,624,323
VALVE ROTATING ASSEMBLY
Filed July 22, 1950     3 Sheets-Sheet 3
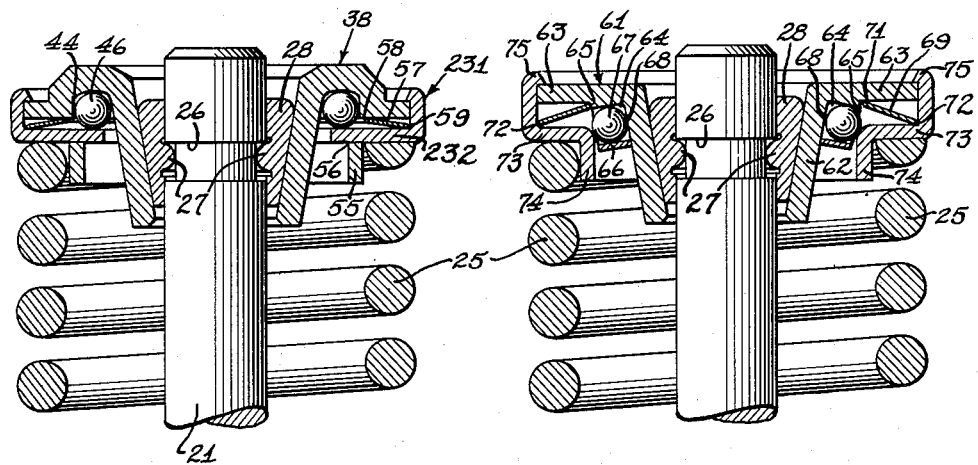
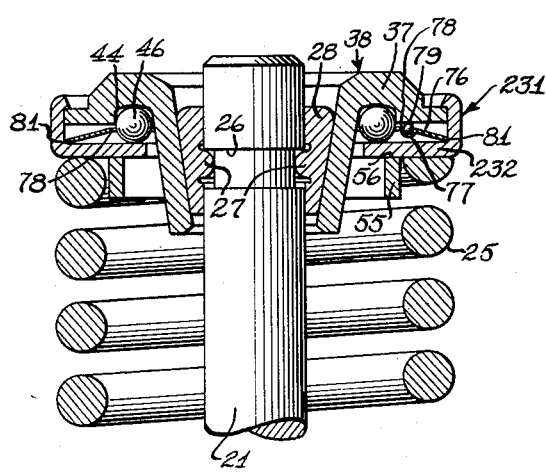
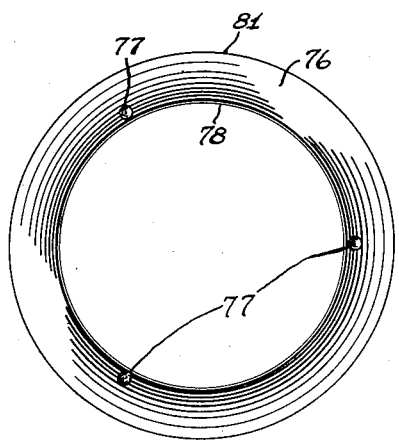
Inventor
Marion F. Thorne Patented Jan. 6, 1953

2,624,323

UNITED STATES PATENT OFFICE 2,624,323

VALVE ROTATING ASSEMBLY

Marion F. Thorne, South Euclid, Ohio, assignor to Thompson Products, Inc., Cleveland, Ohio, a corporation of Ohio Application July 22, 1950, Serial No. 175,351

16 Claims. (Cl. 123—90)

This invention relates generally to devices for rotating valves, and more specifically relates to a simplified readily installed compact self-contained unit for rotating a poppet valve each time the valve head is raised from its seat and the load on the valve spring is thereby increased.

In the Ralston Patent 2,397,502, granted April 2, 1946, the valve rotating unit included a valve spring collar cooperable with a retainer cap affixed to the end of a valve stem and a plurality of shiftable elements were situated between the cap and the collar, there being a resilient deflectable washer arranged between the retainer cap and the collar to be bowed over the shiftable elements so as to selectively convey the spring load to the retainer cap or to the shiftable elements, thereby producing a relative rotation between the retainer cap and the collar and hence between the valve and the valve seat.

According to the features of the present invention, a spring collar is provided to cooperate with a retainer cap fixed to the end of a valve stem. However, unlike the prior Ralston patent, the shiftable elements carried by the retainer cap cooperate only with the spring collar and a resilient load transferring member in the form of a deflectable washer is spaced away from the shiftable elements but between the cap and the collar, thus the shiftable elements, according to the present invention, do not contact the highly stressed resilient washer so that galling thereof is substantially precluded.

Moreover, since the construction of the valve rotating device according to the present invention whereby the resilient washer is spaced away from the shiftable elements makes it unnecessary to bow the resilient washer over the shiftable elements, a smaller resilient washer may be employed and the total washer deflection necessary to produce effective rotation of the valve will be greatly reduced. The washer is also flattened uniformly between the cap and the collar and the balls directly contact both the collar and the cap, thereby insuring that all of the shiftable elements are uniformly displaced.

The structure of the present invention has additional advantages in that the over-all size of the valve rotating device can be greatly reduced and the structural characteristics of the various components may be so simplified as to promote the manufacture thereof with greater economy than was heretofore possible.

It is an object of the present invention, therefore, to provide a valve rotating device in which the components are of reduced size and of simplified construction.

Another object of the present invention is to provide a poppet valve-rotating device wherein a load transferring resilient member is completely separated from the shiftable elements so as to preclude galling thereof.

Yet another object of the present invention is to provide a valve-rotating device of the type employing shiftable ball elements and a resilient deflectable washer wherein the washer is not subjected to contact with the shiftable balls when under a highly stressed condition.

Many other features, advantages and additional objects of the present invention will become manifest to those versed in the art upon making reference to the detailed description which follows and the accompanying sheets of drawings, in which preferred structural embodiments of the present invention are shown.

On the drawings:

Figure 1 is a cross-sectional view, with parts in elevation, of a poppet valve assembly equipped with a valve-rotating device embodying the principles of this invention;

Figure 2 is a view similar to Figure 1 but illustrating the position of the parts when the valve is opened;

Figure 3 is an enlarged fragmentary cross-sectional view with parts shown in elevation showing with greater clarity the details of construction of the valve-rotating device shown in Figs. 1 and 2;

Figure 8 is a cross-sectional enlarged fragmentary view with parts shown in elevation of yet another alternative embodiment according to the present invention;

Figure 9 is an enlarged cross-sectional fragmentary view of one more alternative embodiment according to the present invention;

Figure 10 is an enlarged cross-sectional fragmentary view with parts shown in elevation of still another alternative embodiment according to the present invention; and Figure 11 is a plan view of a resilient deflectable washer employed in the structural embodiment of Figure 10.

As shown on the drawings:

Figure 4:
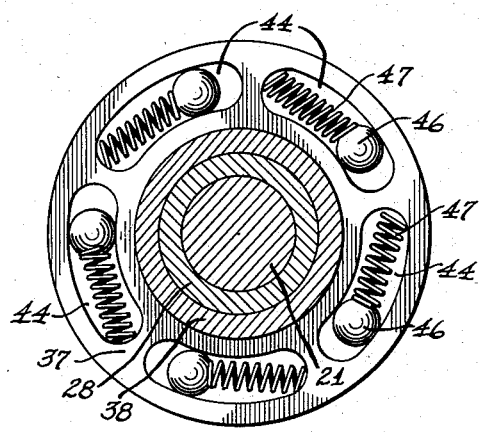
Figure 4 is an enlarged cross-sectional view taken on line IV—IV of Figure 1 showing additional details of construction of a retainer cap employed in the present invention.

In Figures 1 and 2, the reference numeral 15 designates an engine part such as, for example, a portion of the cylinder head of an internal combustion engine. The engine part 15 defines a wall of a combustion chamber 16 and a port 17, such as an exhaust port, having a seat ring 18 secured in the mouth thereof and presenting a beveled seating face for accommodating the head of a poppet valve 19. The stem of the valve 19 indicated by the reference numeral 21 is slidably mounted in a stem guide 22 carried by the engine part 15 and projects through one wall of the engine part 15 into a recess 23.

A ring 24 is provided and arranged in the bottom of the recess 23 to bottom a valve spring 25.

The valve stem 21 is provided with a conventional retainer lock groove 26 formed near the tip end of the valve stem which coacts with a bead 27 of a retainer lock 28.

According to the present invention, a valve-rotating device is interposed between the retainer lock 28 and the valve spring 25 to automatically rotate the valve 19 relative to the engine part 15 each time the valve is open.

Referring first to Figures 1 through 5, the valve-rotating device is indicated generally by the reference numeral 29 and includes a substantially tubular collar 31 having a radially outwardly extending flange portion 32 against which the valve spring 25 may be seated and a radially inwardly extending flange portion 33 at the other end thereof having an opening 34 therethrough and surrounding the top portion of the valve stem 21. The flange portion 32 of the collar 31 is turned over as at 35 and is further provided with a lip 36 which together with the turned over portion 35 and the flange portion 32 of the collar 31, provides a recess to receive a radially outwardly extending flange portion 37 formed on a retainer cap 38. The retainer cap 38 is locked to the end of the valve stem 21 by the retainer lock 28, a generally conical body portion 39 of lesser mean diameter than the flange portion 37 being provided to cooperate with the retainer lock 28.

A deflectable resilient member 41 is shown in the drawings as comprising a washer ring, preferably made of spring metal or the like and is arranged between the collar 31 and the retainer cap 38 so that an inner annular edge indicated at 42 will normally abut the end of the conical body 39 of the retainer cap 38 and the outer annular edge portion indicated at 43 will bottom against the radially inwardly extending flange portion 33 on the collar 31.

Under ordinary circumstances, the deflectable resilient member 41 will transmit normal spring load from the valve spring 25 and the collar 31 to the retainer cap 38 and hence to the valve stem 21 of the valve 19.

Figure 5:
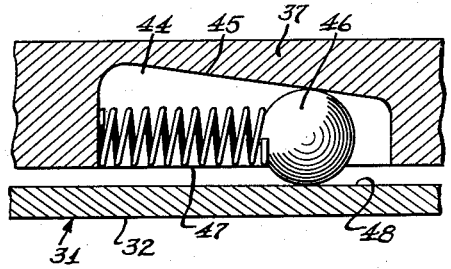
Figure 5 is an enlarged fragmentary cross-sectional view with parts shown in elevation taken on line V—V of Figure 3.

One face of the flange portion 37 of the retainer cap 38 is provided with a plurality of circumferentially arranged generally arcuate raceway recesses 44. As shown in Figure 5, each of the raceway recesses 44 is particularly characterized by an angularly inclined ramp surface 45.

A shiftable element such as a ball 46 is situated within each of the recesses 44 and is normally spring-biased towards one end of the recess by a small coil spring 47 acting between the ball 46 and one end of the recess 44. The shiftable elements or balls 46 are normally urged toward the smallest end of the recess 44 so as to normally contact the ramp surface 45 as well as the table surface 48 presented by the flange portion 32 of the collar 31.

In operation, whenever the deflectable resilient member 41 is deformed under the pressure of an increased load due to the opening of the valve 19 and the increased biasing force of the valve spring 25, the load will be transferred to the shiftable elements or balls 46, whereupon the balls 46 will ride on the ramp surfaces 45 and rotatably drive the retainer cap 38 relative to the collar 31.

Since the collar 31 is held stationary with respect to the engine part 15 by the valve spring 25 and since the retainer cap 38 is locked to the valve stem 21 of the valve 19 by the retainer lock 28, the valve 19 will be rotated relative to the engine part 15 each time the valve 19 is lifted from the seat 18 or, in other words, opened.

It may be pointed out that the structure shown in Figures 1, 2 and 3 is particularly advantageous since it is not necessary to bow the deflectable resilient member 41 over the balls 46, hence, galling of the deflectable resilient member 41 is precluded and a much smaller retainer cap 38 may be employed than would be necessary under other circumstances. Moreover, the collar 31 is shaped structurally as to be easily manufactured from stronger material.

The features of the present invention are applicable to various structural modifications which will now be described in connection with Figures 6, 7, 8, 9 and 10. Wherever identical parts are employed, like reference numerals will be used.

Figure 6:
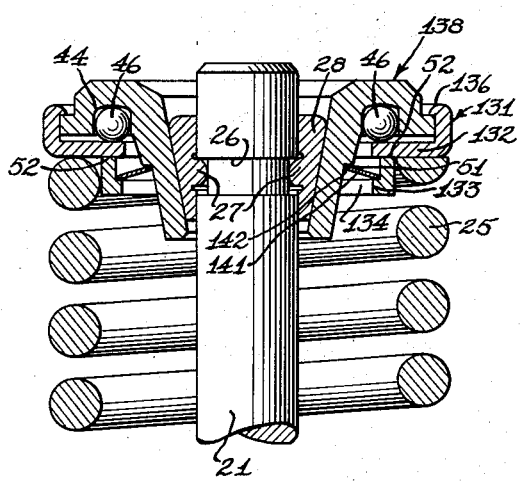
Figure 6 is an enlarged cross-sectional fragmentary view with parts shown in elevation of an alternative embodiment according to the present invention.

In the embodiment of Figure 6, a retainer cap 138 is of the same construction as the retainer cap 38 of Figures 1, 2 and 3 with the exception that an annular shoulder 51 is provided on the conical body portion of the cap so that the inner annular edge 142 of a deflectable resilient member 141 may shoulder thereagainst.

The collar of the structure shown in Figure 6 is indicated by the reference numeral 131 and may be conveniently formed from a first member forming the radial flange portion 132 and an inwardly turned lip 136 and a second member having a radially inwardly extending flange portion 133 with an opening 134 therethrough. These two members may be placed in firm assembly with one another by means of a welded joint 52.

The structure thus provided is not only completely efficient but is especially compact since the overall height of the valve-rotating device is reduced and may be economically fabricated from a plurality of easily manufactured components.

Figure 7:
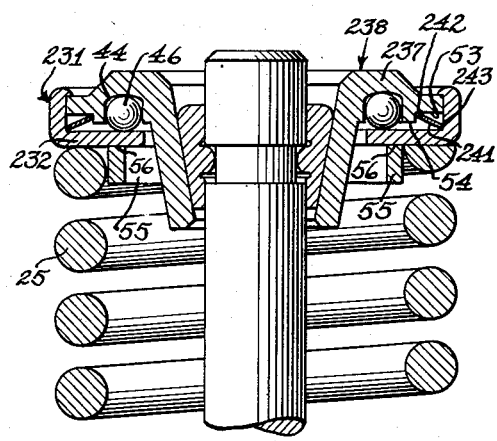
Figure 7 is an enlarged cross-sectional fragmentary view with parts shown in elevation of an additional alternative embodiment according to the present invention.

In the embodiment of Figure 7, the retainer cap is indicated by the reference numeral 238 and is of similar construction to the retainer cap 38 and 138 with the exception that an annular recess 53 is formed in the flange portion 237. The recess 53 is concentrically disposed relative to the circumferentially arranged recesses 44 and shiftable elements or balls 46 and terminates in an annular shoulder 54 so that a deflectable resilient member 241 may be disposed between a flange portion 232 of a collar 231 with the inner annular edge 242 engaging the shoulder 54 and resting in the recess 53 while the outer annular edge 243 engages the flange portion 232 of the collar 231.

In order that the collar 231 may be centered with respect to the valve spring 25, a flange 55 may be fastened to the collar 231 in firm assembly therewith, for example, by means of a welded joint 56, the flange 55 being adapted to be received by the coils of the valve spring 25.

In the embodiment of Figure 8, the retainer cap is identical with that employed in the embodiments of Figures 1, 2 and 3, therefore the retainer cap is again identified by the reference numeral 38.

The collar of the embodiment of Figure 8, however, is identical with that employed in the embodiment of Figure 7. Thus, the collar is indicated by the reference numeral 231 and includes a flange portion 232 having a flange 55 depending therefrom and fastened thereto by means of a welded joint 56, the flange 55 serving to center the collar 231 relative to the valve spring 25.

The deflectable resilient member of the embodiment of Figure 8 is indicated by the reference numeral 57 and comprises a ring of spring metal which is of greater diameter than the outside diameter of the circumferentially arranged recesses 44 housing the shiftable elements or balls 46.

The inner annular edge 58 of the deflectable resilient member 57 engagingly abuts the retainer cap 38 directly adjacent the outermost edge of the recesses 44 and the outer annular edge 59 of the deflectable resilient member 57 engagingly abuts the flange portion 232 of the collar 231 so as to normally transfer ordinary spring loads from the valve spring 25 to the valve.

In the embodiment of Figure 9, the ball races are turned on their sides to facilitate production of the retainer cap as a forging. As will be noted upon the drawings, the retainer cap is indicated generally by the reference numeral 61 and has a conical body portion 62 constructed to cooperate with the retainer lock 28 as well as a radially outwardly extending flange portion 63 at one end of the conical body portion.

A plurality of circumferentially arranged raceway recesses 64 are formed in the retainer cap 61, the side walls of the recesses 64 being formed by an angularly inclined shoulder 65 formed in the flange portion 63 and an annular wall ring 66 which surrounds the conical body portion 62 of the retainer cap 61. The inclined ramp surfaces on which the shiftable elements such as a ball 67 situated in each of the recesses 64 may roll are indicated by the reference numeral 68.

A deflectable resilient member 69 has an inner annular edge 71 engaging the shoulder 65 on the flange portion 63 of the retainer cap 61 and an outer annular edge portion 72 engaging the flange portion 73 of a collar 74 which, in turn, is arranged to seat the valve spring 25 and to encircle the flange portion 63 of the retainer cap 61, a lip 75 being provided on the collar 74 to maintain the retainer cap 61 and the collar 74 in relative assembly.

The operation of the valve rotating device shown in Figure 9 is, of course, similar to the operation previously described in that the deflectable resilient member 69 normally transmits ordinary spring loads from the valve spring 25 and the collar 74 to the retainer cap 61, however, when an increased spring load results in a deformation of the deflectable member 69, the load is transferred to the shiftable elements or balls 67 whereupon, the balls 67 will move on the ramp surfaces 68 and drive the retainer cap 61 rotatably relative to the collar 74.

The structural embodiment shown in Figure 10 is in many respects identical to that shown in Figure 8, however, this particular embodiment is characterized by the provision of a resilient deflectable member 76 which as is shown clearly in Figure 11 and in Figure 10 is provided with a plurality of radially spaced recesses 77 situated immediately adjacent one edge portion thereof and arranged to receive suitable anti-friction elements, thereby to preclude frictional interference with the rotation produced between the retainer cap and the collar. In this particular embodiment, the recesses 77 are formed near the inner annular edge 78 of the ring-like resilient deflectable member 76 so that a ball 79 located in each of the recesses 77 may engagingly abut the flange portion 37 of the retainer cap 38.

The outer annular edge of the resilient deflectable member 76 is indicated at 81 and is shown as engaging the flange portion 232 of the collar 231.

In operation, when the load is transferred to the shiftable elements or balls 46 upon deflection of the resilient deflectable member 76 under increased spring load, the relative rotation of the retainer cap 38 and the collar 231 will result in the movement of the balls 79 in the recesses 77 and against the surface of the flange portion 37 of the retainer cap 38. Thus, rotation will occur without interference due to a friction load which may occur between the resilient deflectable member 76 and the retainer cap 38.

Although I have resorted to detail in the description of the structural embodiments of the principles of my invention, it should be understood that I wish to embody within the scope of this patent all such modifications as reasonably and properly come within the scope of my contribution to the art.

I claim as my invention:

1. A device for effecting relative rotation between two parts when subjected to increased loads which comprises, relatively rotatable parts adapted to be axially loaded and being longitudinally aligned on a common rotational axis, a resilient member between a portion of each of said parts and arranged to transmit normal axial loads from one part to the other, and a plurality of shiftable elements between another portion of each of said parts and arranged to rotatably drive one of said parts relative to the other whenever said resilient member is deflected under an increased axial load and said load is transferred to said shiftable elements.

2. A valve rotating device comprising a collar having a first radially outwardly extending flange portion at one end thereof to seat a valve spring and a second radially inwardly extending flange portion at the other end thereof, a retainer cap constructed to be locked to the end of a valve stem and having a flange portion at one end thereof received by said first flange portion of said collar, a resilient member between the second flange portion of said collar and said cap to transmit normal spring loading from said collar through said resilient member, through said cap and to the valve stem, and a plurality of shiftable members between said flange portions of said collar and said cap constructed to transmit increased loads to said cap and to rotatively drive said cap relative to said collar whenever said resilient member is deflected under an increased load.

3. A valve rotating device comprising a collar having a first radially outwardly extending flange portion at one end thereof to seat a valve spring and a second radially inwardly extending flange portion at the other end thereof, a retainer cap constructed to be locked to the end of a valve stem and having a flange portion at one end thereof received by said first flange portion of said collar, a resilient member between the second flange portion of said collar and the other end of said cap to transmit normal spring loading from said collar through said resilient member, through said cap and to the valve stem, and a plurality of shiftable members between said flange portions of said collar and said cap constructed to transmit increased load to said cap and to rotatively drive said cap relative to said collar whenever said resilient member is deflected under an increased load.

4. A valve rotating device comprising a collar having a first radially outwardly extending flange portion at one end thereof to seat a valve spring and a second radially inwardly extending flange portion at the other end thereof, a retainer cap constructed to be locked to the end of a valve stem and having a flange portion at one end thereof received by said first flange portion of said collar, said retainer cap further having an annular shoulder spaced from said flange portion on the outer periphery thereof, a resilient deflectable member between the second flange portion of said collar and the annular shoulder on said cap to transmit normal spring loading from said collar through said resilient deflectable member, through said cap and to the valve stem, and a plurality of shiftable members between said flange portions of said collar and said cap constructed to transmit increased loads and to rotatively drive said cap relative to said collar whenever said resilient member is deflected under an increased load.

5. A valve rotating device comprising a collar adapted to seat a valve spring, a retainer cap constructed to be locked to the end of a valve stem and having a radially outwardly extending flange portion cooperable with said collar, a plurality of circumferentially arranged shiftable elements between said flange portion and said collar, an annular recess in said flange portion concentrically disposed with respect to said shiftable elements and a resilient deflectable ring in said recess between said collar and said cap, said ring operable to transmit normal spring loads from said collar to said cap, said shiftable elements operable to rotatively drive said cap relative to said collar whenever said ring is deflected under an increased load.

6. A valve rotating device comprising a collar adapted to seat a valve spring, a retainer cap constructed to be locked to the end of a valve stem and having a radially outwardly extending flange portion cooperable with said collar, a plurality of circumferentially arranged shiftable elements between said flange portion and said collar, a resilient deflectable ring engaging said flange portion and being concentrically disposed with respect to said shiftable elements between said collar and said cap, said ring operable to transmit normal spring loads from said collar to said cap, said shiftable elements operable to rotatively drive said cap relative to said collar whenever said ring is deflected under an increased load, said ring having a plurality of radially spaced recesses along one edge thereof and a plurality of anti-friction members in said recesses and between said ring and one of said relatively rotatable collar and cap elements to reduce frictional resistance to rotation therebetween.

7. A valve rotating device comprising a substantially tubular collar having a first radially outwardly extending valve spring seating flange at one end thereof and a second radially inwardly extending flange at the other end thereof, said first flange being turned to provide a recess, a retainer cap adapted to be locked to the end of a valve stem and having a radially outwardly extending flange portion received in said recess, means retaining said flange portion in said recess, a deflectable resilient washer ring having an inner annular edge abutting the retainer cap and an outer annular edge bottomed on said second flange to transmit normal valve spring loading from said collar to said cap, a plurality of circumferentially arranged generally arcuate raceway recesses in said flange portion, each recess forming an angularly inclined ramp surface, a shiftable ball in each recess and a spring in each recess to bias said ball towards the smallest end of the recess and into contact engagement with said first flange and the ramp surface in said flange portion, whereby greater than normal loading of said collar will deflect said washer, whereupon said shiftable balls will transfer the increased load from said collar to said cap and rotatably drive the retainer cap relative to the collar.

8. A valve rotating device comprising a collar having a first member forming a radially outwardly extending flange portion adapted to seat a valve spring and a second member in firm assembly with said first member and adapted to be encircled by the valve spring, said second member having a radially inwardly extending flange portion, a retainer cap adapted to be locked to the end of a valve stem and having a radially outwardly extending flange portion, means retaining said collar and said cap in assemby in rotatable relationship with one another, said retainer cap having an annular shoulder spaced from said flange portion, a deflectable washer ring having an inner annular edge abutting said annular shoulder and an outer annular edge bottomed on said radially inwardly extending flange portion to transmit normal valve spring loading from said collar to said cap, a plurality of circumferentially arranged generally arcuate raceway recesses in said flange portion, each recess having an angularly inclined ramp surface, a shiftable ball in each recess and a spring in each recess to bias said ball towards the smallest end of the recess and into contact engagement with said first flange of said collar and said ramp surface of said flange portion, whereby greater than normal loading of said collar will deflect said washer, whereupon said shiftable balls will transfer the increased load from said collar to said cap and rotatably drive the retainer cap relative to the collar.

9. A valve rotating device comprising a collar arranged to seat a valve spring, a retainer cap adapted to be locked to the end of a valve stem, means retaining said cap and said collar in assembly in rotatable relationship with one another, a plurality of circumferentially arranged generally arcuate raceway recesses in said cap, each of said recesses having an angularly inclined ramp surface, a shiftable ball in each recess, a spring in each recess to bias each ball towards the smallest end of the recess and into contact with said ramp surface and with said collar, an annular recess concentrically disposed with respect to said raceway recesses, an annular shoulder between said annular recess and said raceway recesses, and a deflectable resilient washer having one annular edge engaging said annular shoulder on said cap and another annular edge engaging said collar, to transmit normal valve spring loading from said collar to said cap, greater than normal loading of said collar being operative to deflect said washer, whereupon said shiftable balls will transfer the increased load from said collar to said cap and rotatably drive the retainer cap relative to the collar.

10. A valve rotating device comprising a collar arranged to seat a valve spring, a retainer cap adapted to be locked to the end of a valve stem, means retaining said cap and said collar in assembly in rotatable relationship with one another, a plurality of circumferentially arranged generally arcuate raceway recesses in said cap, each of said recesses having an angularly inclined ramp surface, a shiftable ball in each recess, a spring in each recess to bias each ball towards the smallest end of the recess and into contact with said ramp surface and with said collar, an annular deflectable resilient washer generally concentrically disposed with respect to said raceway recesses having one annular edge engaging said cap and another annular edge engaging said collar to transmit normal valve spring loading from said collar to said cap, greater than normal loading of said collar being operative to deflect said washer whereupon said shiftable balls will transfer the increased load from said collar to said cap and rotatably drive the retainer cap relative to the collar.

11. A valve rotating device comprising a collar arranged to seat a valve spring, a retainer cap adapted to be locked to the end of a valve stem, means retaining said cap and said collar in assembly in rotatable relationship with one another, a plurality of circumferentially arranged generally arcuate raceway recesses in said cap, each of said recesses having an angularly inclined ramp surface, a shiftable ball in each recess, a spring in each recess to bias each ball towards the smallest end of the recess and into contact with said ramp surface and with said collar, an annular deflectable resilient washer generally concentrically disposed with respect to said raceway recesses having one annular edge engaging said cap and another annular edge engaging said collar to transmit normal valve spring loading from said collar to said cap, greater than normal loading of said collar being operative to deflect said washer whereupon said shiftable balls will transfer the increased load from said collar to said cap and rotatably drive the retainer cap relative to the collar, said deflectable member having a plurality of radially spaced recesses immediately adjacent one edge portion thereof and an anti-friction element in each of said recesses to preclude frictional interference upon relative rotation between said retainer cap and said collar.

12. A valve rotating device comprising a retainer cap having a generally cylindrical body portion adapted to be locked to the end of a valve stem and a flange at one end thereof, a plurality of circumferentially arranged raceway recesses in the retainer cap, one of the side walls of each of the recesses being formed by an angularly inclined annular shoulder formed in said flange, the opposite side wall of each of said recesses formed by a wall ring connected to said body portion, each of said recesses being further characterized by an inclined ramp surface between said side walls, a collar surrounding said cap and constructed to seat a valve spring, a deflectable resilient washer having one annular edge engaging said annular shoulder on said flange and another annular edge engaging said collar and a spring biased shiftable element in each recess engaging said collar and said ramp surface, said washer operative to transmit normal valve spring loading from said collar to said cap, greater than normal loading of said collar operative to deflect said washer, whereupon said shiftable elements will transfer the increased load from said collar to said cap and rotatably drive the retainer cap relative to the collar.

13. A device for effecting relative rotation between two parts when subjected to increased loads which comprises, coaxially aligned longitudinally adjacent parts, each having substantial radial and longitudinal extent, with one of said parts having at least a portion thereof concentrically surrounding the other of said parts, a resilient deflectable ring between a portion of each of said parts to transmit normal axial loads from one part to the other and a plurality of shiftable elements between another portion of each of said parts and arranged to rotatably drive one of said parts relative to the other whenever said resilient member is deflected under an increased axial load and such load is transferred to said shiftable elements.

14. A device for effecting relative rotation between two parts when subject to increased loads which comprises, coaxially aligned longitudinally adjacent parts, each having substantial radial and longitudinal extent, with one of said parts having at least a portion thereof concentrically surrounding the other of said parts, a plurality of shiftable elements between said parts and arranged in circumferentially spaced alignment relative to the common axis of said parts, and a resilient deflectable ring between said parts and being concentrically disposed with respect to said shiftable elements, said ring operable to transmit normal loads from one part to the other, said shiftable elements operable to rotatably drive one part relative to the other part whenever said ring is deflected under an increased axial load.

15. A device for effecting relative rotation between two parts when subjected to increased loads which comprises, relatively rotatable parts adapted to be axially loaded and being longitudinally aligned on a common rotational axis, each part having substantial radial and longitudinal extent, with one of said parts having at least a portion thereof concentrically surrounding the other of said parts, a plurality of shiftable elements between said parts and arranged in circumferentially spaced alignment relative to the common axis of said parts, and a resilient deflectable ring between said parts and being longitudinally spaced from said shiftable elements, said ring arranged to transmit normal axial loads from one part to the other, said shiftable elements arranged to rotatably drive one of said parts relative to the other whenever said resilient member is deflected under an increased axial load and such load is transferred to said shiftable elements.

16. A device for effecting relative rotation between two parts when subjected to increased loads which comprises, relatively rotatable parts adapted to be axially loaded and being longitudinally aligned on a common rotational axis, a plurality of shiftable elements between said parts and arranged in circumferentially spaced alignment relative to the common axis of said parts, and a resilient deflectable ring between said parts and being substantially longitudinally and concentrically spaced with respect to said shiftable elements, said resilient deflectable ring operative to transmit normal axial loads from one part to the other, said shiftable elements operative to rotatably drive one of said parts relative to the other whenever said resilient member is deflected under an increased axial load and such load is transferred to said shiftable elements.

MARION F. THORNE.

REFERENCES CITED

The following references are of record in the file of this patent:

UNITED STATES PATENTS

| Number | Name | Date |
| --- | --- | --- |
| 1,341,134 | Keller | May 25, 1920 |
| 2,397,502 | Ralston | Apr. 2, 1946 |
| 2,493,783 | Stancliff | Jan. 10, 1950 |
| 2,532,346 | Stancliff | Dec. 5, 1950 |